United States Patent [19]

Chodosh

[11] 4,377,431

[45] Mar. 22, 1983

[54] PLEATING AND LAMINATING

[76] Inventor: Edward Chodosh, 28 Northiam St., London, E8 4RY, England

[21] Appl. No.: 238,164

[22] Filed: Feb. 26, 1981

Related U.S. Application Data

[63] Continuation-in-part of Ser. No. 100,439, Dec. 5, 1979, abandoned.

[30] Foreign Application Priority Data

Dec. 5, 1978 [GB] United Kingdom ............... 47255/78

[51] Int. Cl.³ .............................................. B31F 1/00
[52] U.S. Cl. .................................. 156/204; 156/227; 428/181
[58] Field of Search ............... 156/201, 204, 474, 210, 156/227; 428/175–176, 102, 181; 223/30, 28, 46; 112/132, 427

[56] References Cited

U.S. PATENT DOCUMENTS

| | | | |
|---|---|---|---|
| 1,468,483 | 9/1923 | Loomis | 223/30 X |
| 1,789,421 | 1/1931 | Angelus | 223/30 |
| 2,769,740 | 11/1956 | Gordon | 417/18 |
| 2,874,754 | 2/1959 | Yost et al. | 428/182 |
| 2,979,240 | 4/1961 | Liebeskind | 223/30 |
| 3,349,159 | 10/1967 | Luboshez | 264/282 |
| 3,616,974 | 11/1971 | Jordan | 112/132 X |
| 3,770,543 | 11/1973 | Darabant | 156/204 |

*Primary Examiner*—David A. Simmons
*Attorney, Agent, or Firm*—Browdy & Neimark

[57] ABSTRACT

A method of producing a laminated, pleated fabric is provided which method comprises passing a first layer of fabric through a pleating machine to form temporary pleats and then feeding the first layer of fabric together with an adhesive material and a second layer of fabric onto a winding roller so that the adhesive layer is disposed between the first layer of fabric (which is formed with the temporary pleats) and the second layer of fabric. The three layers are substantially co-extensive in size. The adhesive material is then activated e.g. with steam or dry heat, so that the first and second layers of fabric are laminated together. The steam or heat also makes the pleats in the first layer of fabric permanent. The method can be operated as a relatively simple, continuous process to produce a laminated, pleated fabric which is visually attractive and comfortable to wear.

2 Claims, 1 Drawing Figure

PLEATING AND LAMINATING

RELATED APPLICATION

This is a continuation-in-part of my earlier Application Ser. No. 100,439 filed Dec. 5, 1979 now abandoned.

BACKGROUND OF THE INVENTION

This invention relates to pleating and laminating, i.e. the production of a pleated fabric which is laminated to a suitable backing material.

Pleated fabrics are used widely in the clothing industry, particularly for ladies fashion wear. Pleated fabrics tend to be uncomfortable when worn next to the skin, so that it is often desirable to use a laminated fabric comprising a suitable backing material to which the pleated fabric is laminated.

SUMMARY OF THE INVENTION

According to the present invention, there is provided a method of producing a laminated, pleated fabric, which comprises (a) passing a first layer of fabric through a pleating machine to form temporary pleats in said first layer of fabric; (b) feeding the first layer of fabric together with (1) a web of heat- or steam- activatable adhesive material and (2) a second layer of fabric to a winding roller where the three layers are wound together, the adhesive layer being disposed between the first and second fabric layers, all three layers being substantially co-extensive in size; and (c) heating or steaming the wound layers so as to activate the adhesive material, thereby laminating the second layer of fabric onto the first layer of fabric and simultaneously making permanent the pleats in said first layer of fabric. It should be understood that the term "temporary pleats" as used herein encompasses arrangements in which the fabric is merely folded into the required pleat pattern as well as those in which some heat and/or pressure is applied during the folding so as to reduce the tendency of the folds to fall loose. It should also be understood that the three layers are all of the same size, or are not substantially different in size, so that the end product is a fabric laminate and not, for example, a single layer of fabric edged or decorated with a second fabric.

The invention also provides fabrics whenever produced by the above method.

DESCRIPTION OF THE PREFERRED EMBODIMENTS

In comparison with conventional pleating arrangements, it is advantageous if the first layer of fabric is fed to the pleating machine so that it emerges "wrong side up"—i.e. with that surface of the fabric which will not be seen when the fabric is made into a garment being uppermost. If necessary, the pleating can be carried out between two thicknesses of paper, although with such an arrangement it will be necessary for the top layer of paper to be removed and rewound on suitable apparatus before the first layer of fabric proceeds to the lamination stage. The upper layer of paper may be removed and rewound automatically on apparatus mounted above and just behind the top roller of the pleating machine, the rewind apparatus being calibrated to operate at the same linear speed as the pleating machine. It is preferred, however, to produce the temporary pleats without the use of a top paper layer, since in this way the paper rewinding operation is obviated. In some cases it will be essential to use a top paper layer, this being dependent on factors such as pleat size, thickness and resilience of the fabric Many types of pleat may be formed in the first layer of fabric. Examples of different types of pleat include straight yvette; diagonal yvette; crystal; accordion; mushroom; crushed mushroom; open end crystal; box; knife; and push up pleats.

Where the first layer of fabric in which the temporary pleats have been formed leaves the rollers of the pleating machine "wrong side up", the adhesive layer and the second layer of fabric (which is to be the backing fabric) can be fed from above to come into contact with the first layer of fabric. The three layers may be passed through a pair of rollers before being wound onto a suitable drum. The second layer of fabric, which is not pleated, need not be the same fabric as the first layer of fabric; a lining material or any other desired fabric may be used. The second layer of fabric may be the same as the first layer of fabric if so desired.

The winding of the sandwich of fabrics and adhesive can be effected automatically using apparatus calibrated to operate at the same linear speed as the pleating machine. The heating or steaming of the wound layers can be effected in a conventional manner, and results in the lamination of the two fabric layers while simultaneously producing permanent pleats in the first layer of fabric.

Conventional pleating machines can readily be adapted to operate the method of the present invention. In this way, a laminated pleated fabric which is visually attractive and comfortable to wear can be produced in a relatively simple, continuous process.

DESCRIPTION OF THE DRAWING

The accompanying drawing illustrates diagrammatically the method of the invention, showing the presently preferred arrangement for performing the invention to produce knife pleats.

In the drawing, the pleating apparatus comprises a heated top roller 1, a heated bottom roller 2, a floating roller 3 and a so-called heat blanket 4 disposed about the top roller 1 and the floating roller 3. Pleating knives 5 are used to form the knife pleats upstream of the nip between the rollers 1 and 2 (shown enlarged in the drawing for ease of illustration). A base cloth A is fed over a support roller 6 to the nip. A heat-activatable, double sided adhesive layer B is fed beneath the base cloth A. The facing cloth C (i.e. the material which will constitute the "finished" side of the laminated fabric) is supplied faceside-down together with pleating paper D to the pleating knives 5, where the paper and fabric C are formed into temporary pleats. The three layers A, B and C are identical in size. The four layers A, B, C and D meet in the nip between rollers 1 and 2, where the heat and pressure together result in the lamination of the backing cloth A to the facing cloth C while the knife pleats in C are made permanent. The resultant fabric possesses the advantages of a pleated fabric combined with the comfort, to the wearer, of a non-pleated fabric. This is because the backing cloth A prevents a uniform surface in contact with the skin of the wearer, whereas a simple pleated fabric (such as facing cloth C alone) presents an irregular surface to the skin which may cause irritation. A further benefit is that, if the wearer is not sensitive to skin contact with the pleated face of the fabric, the fabric may be used to make up an invertible garment (one which can be worn back-to-front as well as in the usual way).

Figure 1:
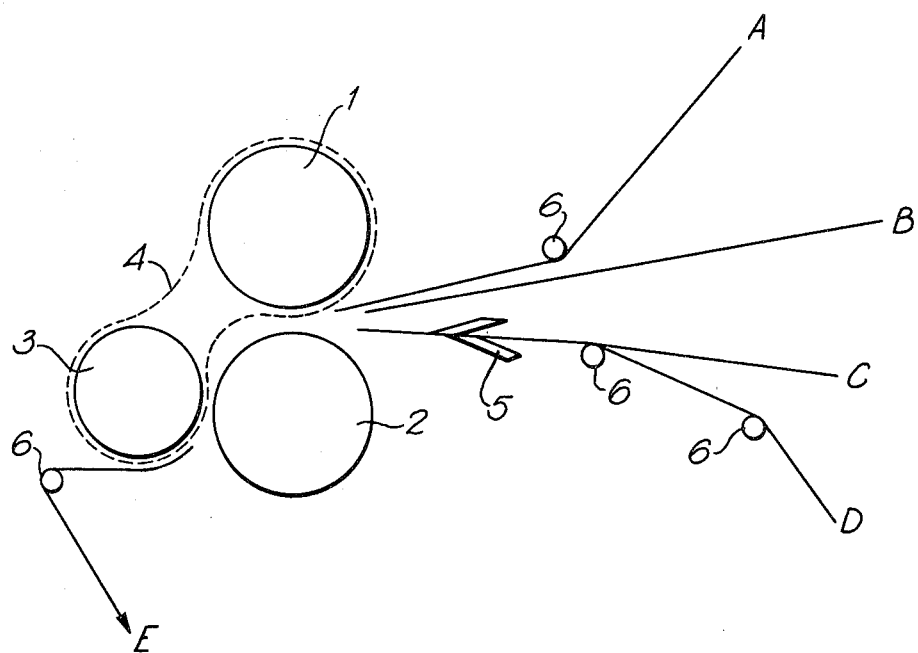

What is claimed is:

1. A method of producing a laminated, pleated fabric, which comprises (a) passing a layer of fabric through a pleating machine to form a first layer of fabric having temporary pleats therein; (b) feeding the first layer of fabric together with (1) a web of heat-or-steam-activatable adhesive material and (2) a second layer of fabric to a winding roller where the three layers are wound together, the adhesive layer being disposed between the first and second fabric layers, all three layers being substantially co-extensive in size; and (c) heating or steaming the wound layers so as to activate the adhesive material, thereby laminating the second layer of fabric onto the first layer of fabric and simultaneously making permanent the pleats in said first layer of fabric.

2. A method according to claim 1, wherein the temporary pleats are formed without the use of a paper layer on top of the fabric.

* * * * *